US010237926B2

(12) United States Patent
Miller et al.

(10) Patent No.: US 10,237,926 B2
(45) Date of Patent: Mar. 19, 2019

(54) INDUCTIVE HEATER FOR AREA ARRAY REWORK SYSTEM AND SOLDERING HANDPIECES

(71) Applicant: PACE, INC., Southern Pines, NC (US)

(72) Inventors: Thomas Wayne Miller, Eldersburg, MD (US); Ramgopal Nair, Ellicott City, MD (US)

(73) Assignee: PACE, INC., Vass, NC (US)

( * ) Notice: Subject to any disclaimer, the term of this patent is extended or adjusted under 35 U.S.C. 154(b) by 306 days.

(21) Appl. No.: 15/080,724

(22) Filed: Mar. 25, 2016

(65) Prior Publication Data

US 2017/0135161 A1     May 11, 2017

Related U.S. Application Data

(60) Provisional application No. 62/252,761, filed on Nov. 9, 2015.

(51) Int. Cl.
| | |
|---|---|
| *B23K 13/02* | (2006.01) |
| *H05B 6/10* | (2006.01) |
| *B23K 1/012* | (2006.01) |
| *B23K 101/36* | (2006.01) |

(52) U.S. Cl.
CPC ............ *H05B 6/108* (2013.01); *B23K 1/012* (2013.01); *B23K 2101/36* (2018.08)

(58) Field of Classification Search
CPC . H05B 6/02; H05B 6/06; H05B 6/108; H05B 6/36; B23K 1/0016; B23K 1/002; B23K 1/005; B23K 1/0053; B23K 1/008; B23K 1/012; B23K 1/018; B23K 2201/36
USPC ....... 219/600, 616, 617, 628, 630, 603, 633, 219/635, 636, 638, 634; 228/4.1, 6.2, 19, 228/20, 20.1, 10.5, 44.7, 119, 180.21, 228/191, 264

See application file for complete search history.

(56) References Cited

U.S. PATENT DOCUMENTS

| | | | |
|---|---|---|---|
| 2,407,562 A * | 9/1946 | Lofgren | ................ H05B 6/108 219/630 |
| 3,685,139 A | 8/1972 | Early et al. | |

(Continued)

FOREIGN PATENT DOCUMENTS

| | | |
|---|---|---|
| DE | 101 53 368 A1 | 5/2003 |
| EP | 0 075 811 A1 | 4/1983 |

(Continued)

*Primary Examiner* — Hung D Nguyen

(74) *Attorney, Agent, or Firm* — David S. Safran; Roberts Mlotkowski Safran Cole & Calderon, P.C.

(57) ABSTRACT

An induction heater having inner and outer chamber cylinders connected in an air tight manner to a base and cover with an inner chamber being formed within the inner chamber cylinder and an outer chamber being formed between the inner and outer chamber cylinders, a heat exchange core disposed in the inner chamber, and an induction heater coil disposed in the outer chamber extending around the inner chamber cylinder. A flow path is provided from a cool air inlet in the base, along the outer chamber, into the inner chamber and through the inner chamber and core to a heated air outlet in the base in a counterflow direction relative to the flow along the outer chamber. The heater is especially well suited for use in convective soldering and rework apparatus.

18 Claims, 9 Drawing Sheets

(56) References Cited

U.S. PATENT DOCUMENTS

| | | | | |
|---|---|---|---|---|
| 5,309,545 | A | * | 5/1994 | Spigarelli ............ B23K 1/0053 |
| | | | | 219/85.12 |
| 5,958,273 | A | | 9/1999 | Koch et al. |
| 6,008,482 | A | * | 12/1999 | Takahashi ............. B24B 49/105 |
| | | | | 219/601 |
| 6,131,791 | A | * | 10/2000 | Masaki .................. B23K 1/018 |
| | | | | 228/119 |
| 2003/0235423 | A1 | * | 12/2003 | Ota ...................... G03G 15/205 |
| | | | | 399/69 |
| 2014/0027444 | A1 | | 1/2014 | Kohl et al. |
| 2016/0348301 | A1 | * | 12/2016 | Spitz ....................... D06F 58/20 |

FOREIGN PATENT DOCUMENTS

| | | |
|---|---|---|
| EP | 2 941 103 A1 | 11/2015 |
| WO | 2009/050631 A1 | 4/2009 |

\* cited by examiner

INDUCTIVE HEATER FOR AREA ARRAY REWORK SYSTEM AND SOLDERING HANDPIECES

BACKGROUND OF THE INVENTION

Field of the Invention

This invention relates generally to convective automated and semi-automatic rework systems for the installation and removal of electronic components with respect to a circuit board. More specifically, these components are of the leadless Area Array (or Land Grid Array) type whose means of electronic interconnection with the circuit board is by way of solder balls, solder columns or terminations on the underside of the component body.

Description of Related Art

Representative examples of such component packages include BGAs, PBGAs, CSPs or µBGAs, CBGAs and QFNs. These components are either attached to or removed from the circuit board by heating all the solder interconnections ("solder joints") simultaneously with a heated fluid (typically air or nitrogen) to some point above solder melt temperature followed by a period of cool down to allow the solder joints to solidify during an installation process, or by separating or lifting the component from the circuit board immediately, well prior to solder solidification during a removal process.

The heated fluid for the solder reflow process is typically provided via an air blower (at a rate of approximately 5-35 SLPM) which passes air through a heater with resistance coil heating elements, where it is heated to a temperature well above solder melt temperature (e.g., 183° C. for Sn63/Pb37 alloy and 217° C. for Sn96.5/Ag3.0/Cu0.5 alloy) and subsequently passed over the component, component mounting site and circuit board to effect solder reflow at the solder joints. In some cases, particularly with high thermal mass circuit boards or components, additional heat is required to be applied to the underside of the circuit board for pre-heating purposes to facilitate and/or hasten the component installation or removal process. Such underside pre-heating is provided by a secondary source of heated fluid, or an IR radiant heating system.

Induction heating methods are well known in various applications such as cooktops, household heating systems, welding and even soldering systems where a workpiece to be soldered (e.g., a steel, copper, brass or aluminum parts) is introduced within an induction coil and heated.

However, induction heating has never before been used to heat a fluid for convective soldering and rework, particularly in a benchtop system specifically for convective rework and with all its attendant advantages over resistance coil heaters discussed below.

The resistance coil heating elements typically employed in such convective reflow systems are often expensive to construct, require costly replacement of the entire element when they fail, have a high incidence of failure, are relatively inefficient at transferring heat to the fluid passing through them and require a great deal of power to operate making them relatively energy inefficient. Resistance coil heating elements are also difficult to control from a temperature standpoint inasmuch as they require relatively robust, high thermal mass construction and thus cannot cool down quickly from a higher temperature setting when a lower temperature setting is subsequently desired.

Due to their relative inefficiency at transferring heat to the fluid (as well as the relative inefficiency of the fluid to transfer heat to the workpiece), such heaters must be overly powered which in turn requires them to be relatively dimensionally large, physically and thermally robust (resistance heating coils must be mounted to a highly heat resistant core such as ceramic or aluminum oxide) and very well insulated or isolated from the rest of the internal components of the rework system so they may withstand significant errant heating, particularly during heavy, continuous use. This also causes the physical size of the reflow head (of the rework system) to grow to disproportionate dimensions (for adequate thermal and electrical isolation) and/or subjects other delicate systems (which by necessity must be in close proximity to the heating element) to excessive heat, degradation and premature failure. A further key negative consequence of such resistance coil heating elements is their very high thermal mass, which causes the heater to take an inordinately long time to heat up from ambient temperature thus delaying throughput of the component rework process. What's more, the high thermal mass acts as a dampener or buffer to the ability of the reworks system to precisely and rapidly control the temperature of the heated fluid and thus better control the component reflow process (during component installation or removal).

This consequence, along with the relatively inefficiency of such heaters to transfer heat to the fluid (as well as the relatively inefficiency of the fluid to transfer heat to the workpiece) as mentioned above, presents a significant challenge to achieving a high level of process control during the rework process which is essential as process requirements varies significantly across various types of circuit boards, components and electronic assemblies.

SUMMARY OF THE INVENTION

The present invention includes a novel induction heater method and arrangement for the controlled, reliable and efficient heating of fluid in a convective rework system for the installation and removal of electronic components, particularly area array components.

The induction heater consists of a nickel plated copper induction coil (in an LC resonant Royer oscillator circuit) around an inner glass chamber filled with a ferromagnetic stainless steel wool core through which fluid passes and is efficiently heated. The induction coil is contained within an outer glass chamber through which the ambient temperature fluid first passes before passing through the inner glass chamber and core. This not only preheats the fluid prior to passing through the steel wool (for greater thermal efficiency in the heat transfer process), but also keeps the Induction Coil cool thus protecting adjacent mechanical and electrical systems from excessive, errant heat and extending the life of the Coil itself.

High current (~60-70 Amps), high frequency (~130 kHz) AC pulse power passes through the Induction Coil which is controlled by a closed-loop thermocouple temperature control arrangement which measures the temperature of the heated fluid stream as it exits the inner glass chamber.

In a typical induction heating system, as current passes through the induction coil, it creates an electromagnetic field within the core, and in turn causes the core material to heat up by both Eddy (or Foucault) Currents and Magnetic Hysteresis produced therein. Heating by way of the later phenomenon is automatically governed as the material reaches its Curie point or temperature at which the core material loses its permanent magnetic properties and will heat no further due to loss of the Magnetic Hysteresis effect. This may offer the advantage of providing an additional protection against the heater running away and burning up should the primary temperature control system (the thermocouple in the exit air stream of the closed-loop temperature control system) for some reason fail.

The induction heater of the present invention is usable in place of the resistance heater in existing reflow systems such as PACE's ThermoFlo Rework Systems (Models TF 1700 & TF 2700) as described in the PACE Worldwide brochure SMT & Area Array Rework, 2015. These systems employ traditional Convection Heaters comprised of resistance coils (mounted with respect to a ceramic substrate) through which ambient-temperature air is blown and heated to well above the solder melt temperature before reaching the component and board mounting site to effect solder reflow during a component installation or removal procedure.

On a small scale, the induction heater of the present invention is also usable in soldering handpieces, such as PACE's ThermoJet® air pencils (Models TJ-70 and TJ-85) as the means for heating air that is delivered for installation and removal of chip components and SOTs.

To implement the new heater of the present invention in such an existing device, besides removing the old resistance heating coil convective, or other heater, and replacing it with the new induction convection heater, circuitry to power and control it would need to be changed to one suitable for an induction heater and the control would have to be adapted to conform to how the ambient-temperature air is controlled and supplied to the respective heaters, an example of one suitable circuit being shown in FIG. 7 of this application.

Alternatively, the inductive heater could be incorporated within the power source itself and heat the air being supplied.

The induction heater arrangement of the present invention offers the following key advantages over the prior art:

1. The stainless steel core has a great deal more surface area than the resistance heater coils (in the prior art heater elements) and requires the fluid to pass through irregular channels (facilitating better fluid mixing) which both provide vastly superior heat transfer to the fluid as it passes through.
2. The stainless steel wool core as well as the overall induction heater is low in thermal mass, thereby allowing the rework system to come up to target temperature faster and cool off more quickly providing superior process control and faster work throughput. The quick cooldown of the heater also offers the ability of the rework system to provide an "active cooling phase" of the component and circuit board after reflow and obviates the need for an external fan to serve this function.
3. The thermal and energy efficiency of the induction heater produces far less errant heat and is dimensionally smaller. This is the result of not only its low thermal mass character but also its design in which the ambient temperature fluid first passes over the induction coil itself prior to passing through the core material. The fluid first enters the outer glass chamber containing the induction coil in such a way as to create a vortex flow pattern to maximize heat transfer from the coil to the fluid (as well as more uniform cooling of the coil) before it passes through the inner glass chamber and core material.
4. This results in two benefits: 1) the fluid is both preheated (prior to passing through the core material) and results in greater efficiency of heat transfer from the heater to the fluid, and 2) the induction coil is kept relatively cool thereby greatly reducing the amount of errant heat produced which could adversely affect adjacent delicate mechanical and electrical systems.
5. The subsequent benefit of #3 is that such delicate mechanical and electrical systems can be safely located in close proximity to the induction heater and will not be adversely affected by errant heating which could cause them to lose their precision or reliability. A notable example of this would be the vacuum pick travel system which by operational necessity must be in close proximity to the heater and maintain very tight tolerances due to its role in alignment and placement of very fine pitch components where placement accuracies are measured in thousandths (0.001) of inches.
6. In older convective rework systems with resistance coil heaters, the vacuum pick travel system had to pass very close or through the heater causing it to warp, lose its tolerances or fail. In the present invention, this problem is eliminated.
7. The efficiency of the heating system provides great cost savings to the user as it uses far less power than older systems with resistance coil heaters.
8. The induction heater offers far greater reliability and longer life than resistance coil heaters. There are no heating coils to burn out which can occur frequently due to the difficulty of controlling them. The stainless steel wool core, which could break down over time, is easily and quickly replaced at very little cost. Also the cooling effect of the fluid first passing over the induction coil greatly reduces thermal breakdown of the copper and nickel plating thereby extending its life.
9. The induction heater's ability to efficiency transfer heat to the fluid (and subsequently to the work) can in some cases lessen or obviate the need for additional bottom pre-heating.
10. The ability to locate the power circuitry in close proximity to the heater coil improves stability of the oscillator circuit and simplifies the design of RFI shielding that may be required.

DETAILED DESCRIPTION OF THE INVENTION

Figure 1:
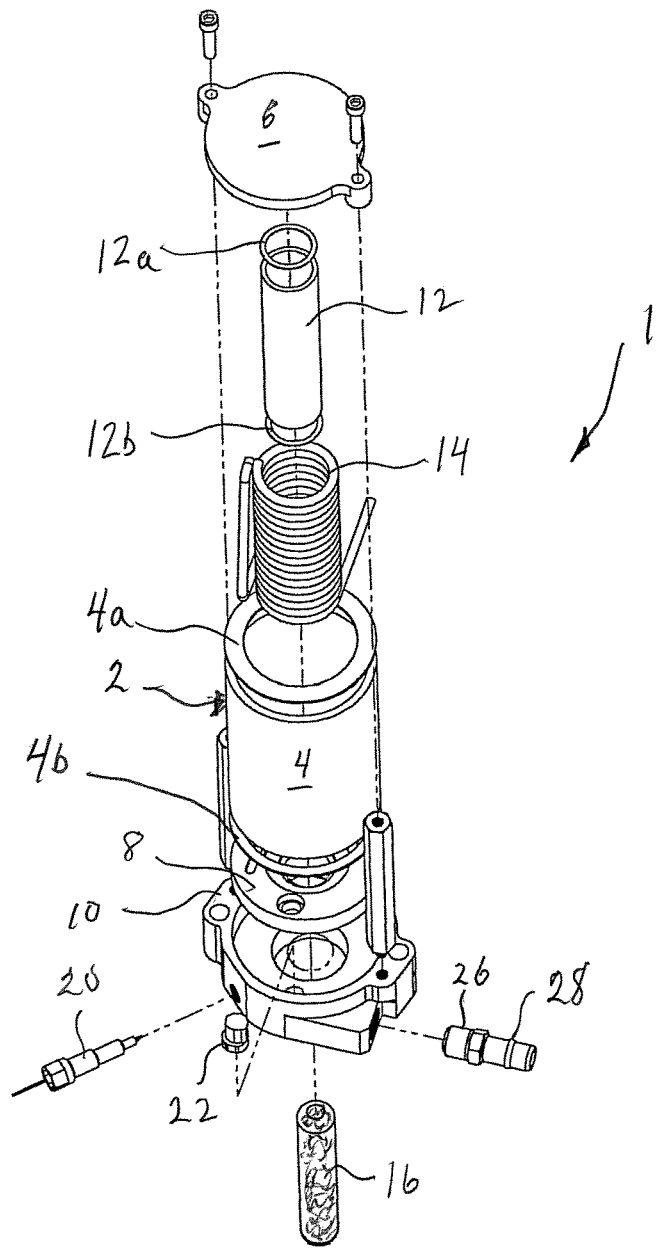
FIGS. 1-3 are exploded, perspective and longitudinal section views, respectively, of the induction heater of the induction heater assembly.
Figure 2:
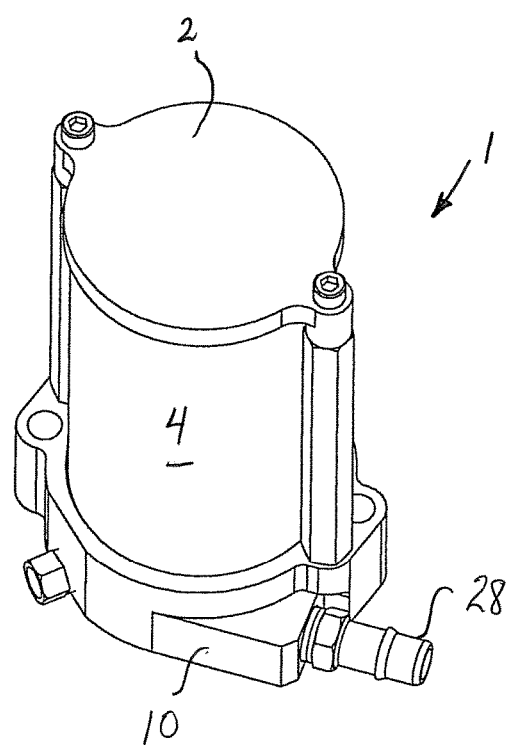
Figure 3:
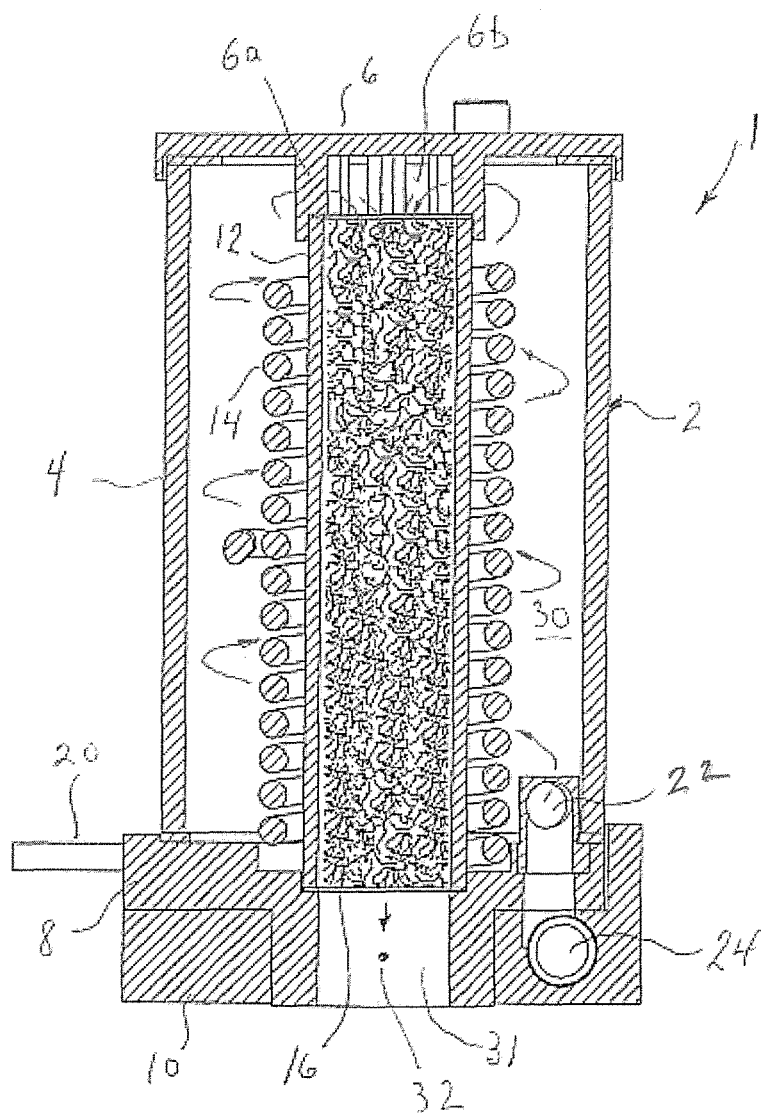

FIGS. 1-3 show an induction heater 1 with a housing 2. The housing 2 comprises a cylindrical outer chamber wall 4, e.g., made of glass, that is closed at the top by a cap 6 and at the bottom by a ceramic base part 8 and a metal base part 10. A cylindrical inner chamber wall 12 made, e.g., of glass, is held in a shoulder recess of the ceramic base part 8 and a shoulder recess of an inlet projection 6a of the cap 6. An induction coil 14 is mounted about the cylindrical inner chamber wall 12 and a core 16, which can be a steel wool type material, fills the interior of the chamber formed within the cylindrical inner chamber wall 12. Gaskets 12a, 12b are provided at the ends of the cylindrical inner chamber wall 12 and gaskets 4a and 4b at the ends of the outer chamber wall 4 to provide air-tight sealing thereof relative to the cap 6 and ceramic base part 8, respectively.

The ceramic base part 8 contains a passage into which a terminal 20 for connection to a thermocouple 32 is received. The ceramic base part 8 contains an opening into which an inlet piece 22 is inserted and which also connects to an inlet passage 24 of the metal base part 10 to a fitting 26 of a supply line 28. The cap 6 has openings 6b in the inlet projection 6a and the base part 8 has a discharge passage 31 in which a thermocouple 32 is located.

The induction heater 1 is in effect a counterflow heat exchanger. Cool air from the supply line 28 passes through the inlet passage 24 and out through inlet piece 22 into the outer chamber 30 in a horizontal direction to produce a vortex flow around the induction coil 14 and inner chamber 12. As the cool air travels up chamber 30 it is preheated by the induction coil 14 which is cooled as a result. The preheated air passes through inlets 6b into the chamber formed within the cylindrical inner chamber wall 12 where it passes down through the core 16 and out of the heater 1 through discharge passage 31. Thermocouple 32 is located in the discharge passage 31 to measure the temperature of the exiting hot air to provide temperature feedback to a control circuit, an example of which is shown in FIG. 7.

Figure 4:
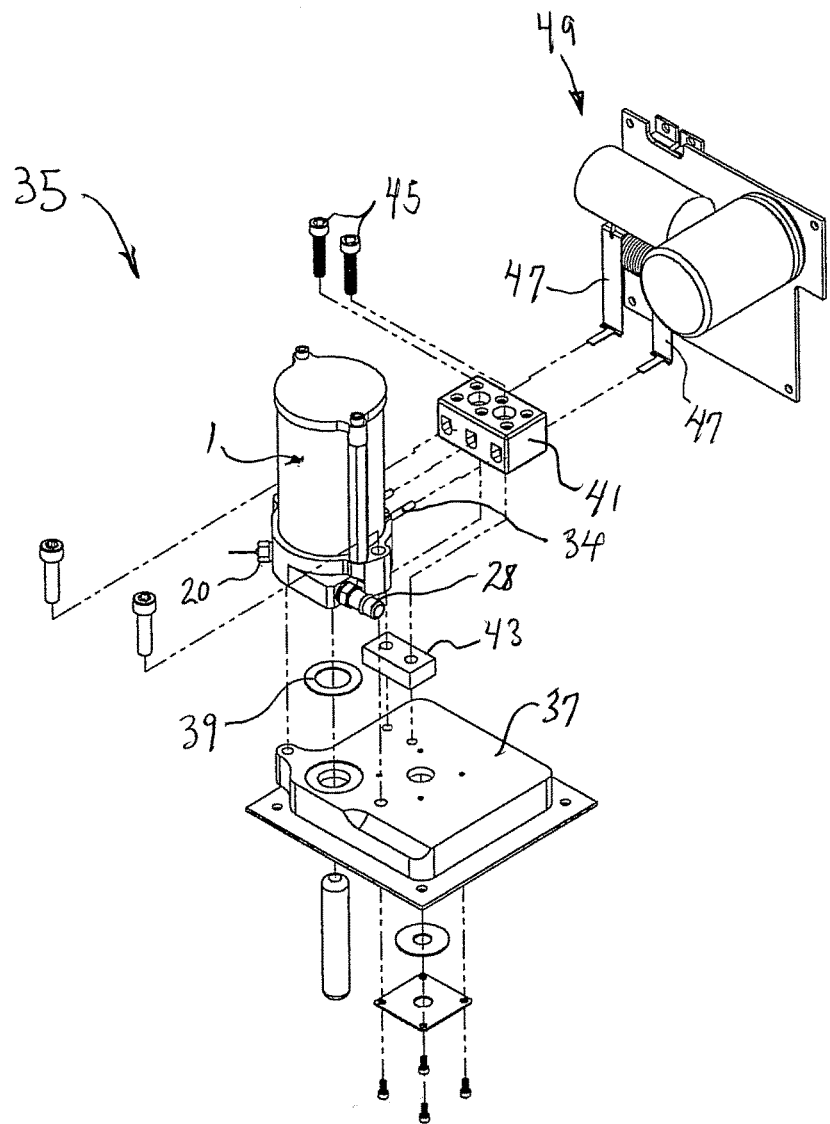
FIG. 4 is an exploded perspective view of an induction heater assembly in accordance with the invention.

With reference to FIG. 4, it can be seen that the induction heater 1 is part of a heater assembly in which it is mounted to a heater box 37, a gasket 39 providing an air tight seal between the heater 1 and heater box 37. A high temperature ceramic terminal block 41 is supported on a spacer 43 and connected to the heater box 37 by screws 45. The leads 34 of the induction coil 14 are connected to large surface area conducting strips 47 in the terminal block 41. The conducting strips 47, made for example of copper, connect the induction coil 14 to the drive circuit 49. The large surface area conducting strips 47 also provide convection cooling by ambient air, thereby enabling the drive circuit 49 to be in close proximity to the induction heater 1 without causing overheating of the drive circuit.

Figure 5:
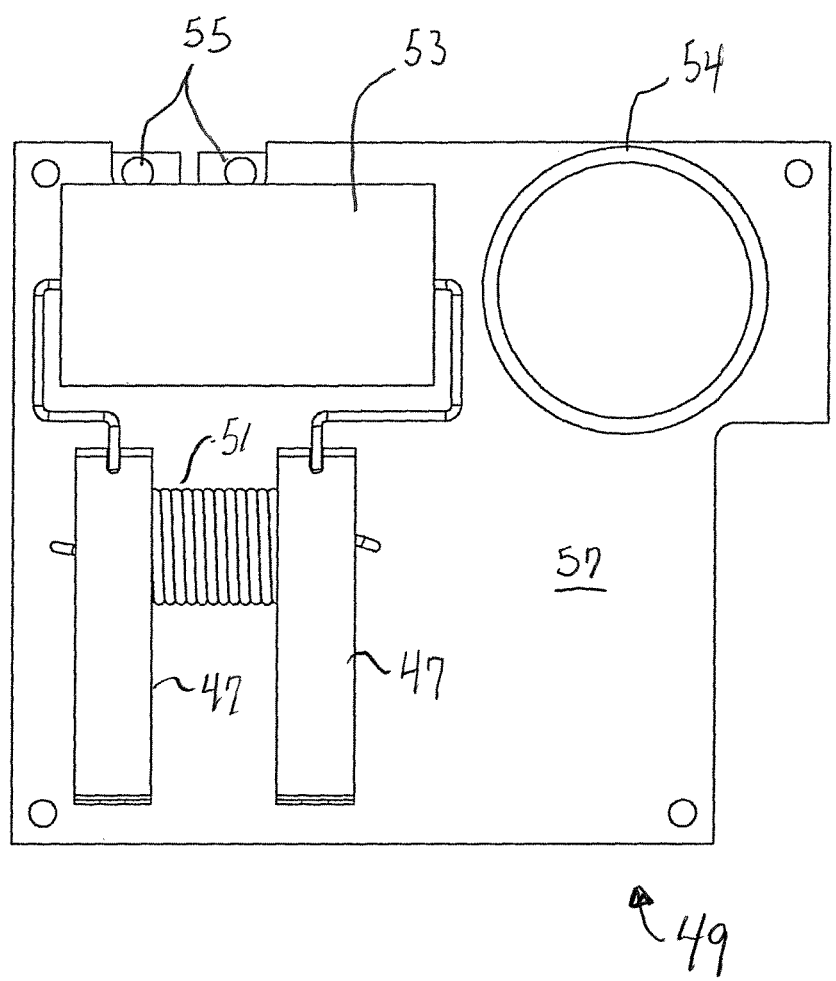
FIGS. 5 & 6 are plan and side views of a control board of induction heater assembly in accordance with the invention.
Figure 6:
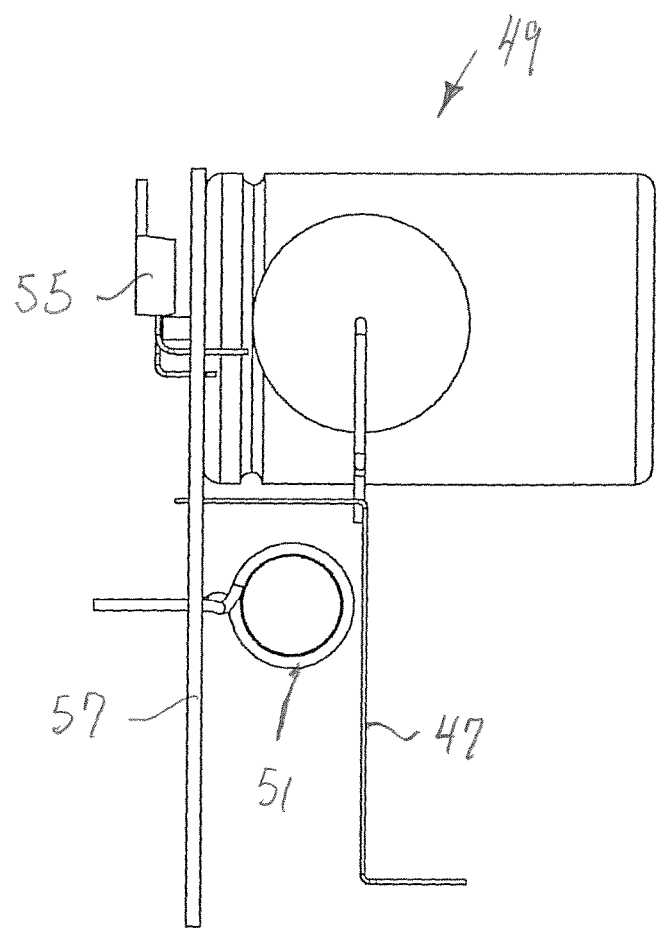
Figure 7:
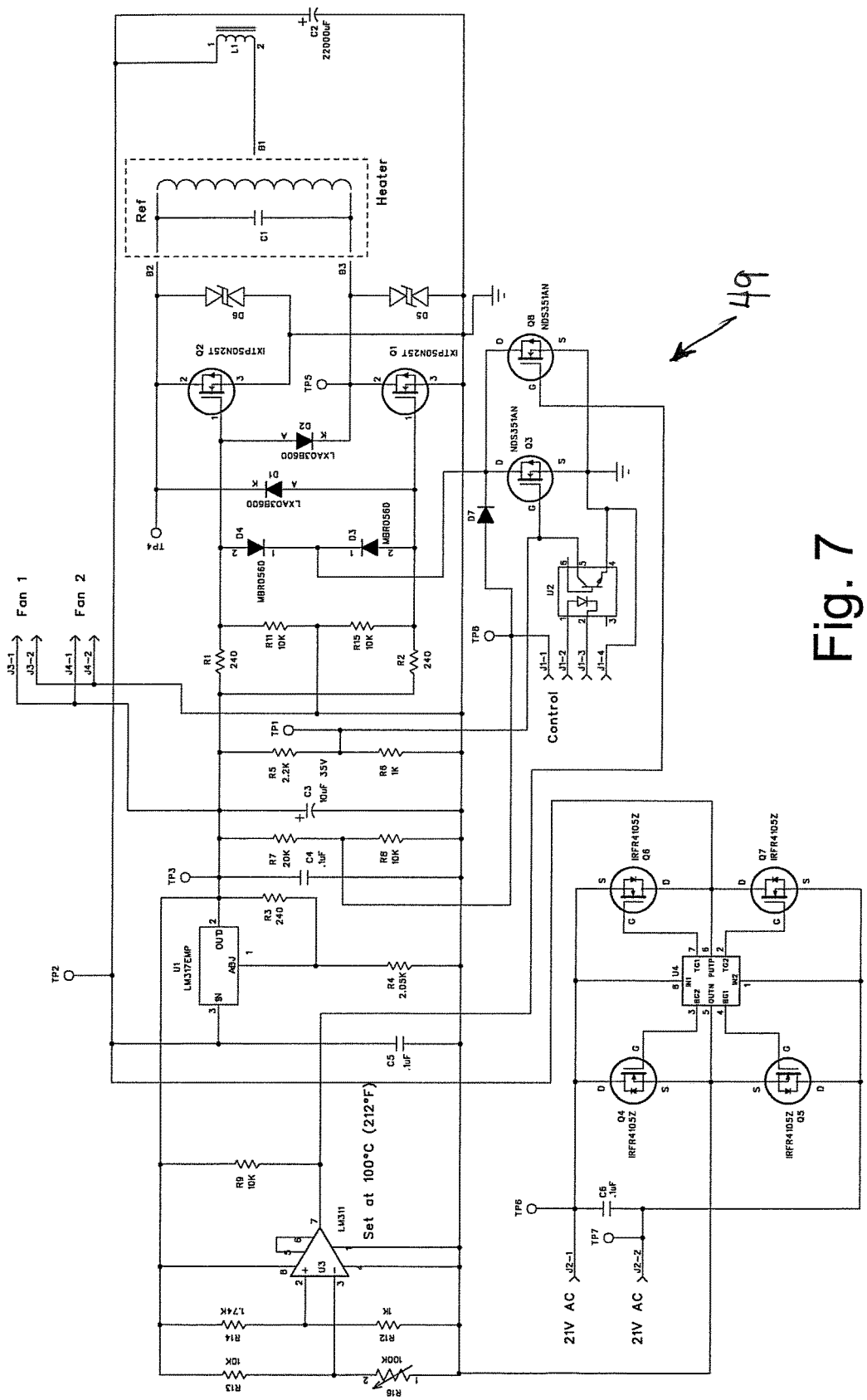
FIG. 7 shows an example of a control circuit for the induction heater.

Other elements of the drive circuit shown in FIGS. 4 & 5 are a choke 51, capacitors 53, 54, and NFETs 55 that are carried on a printed circuit board 57 having the remainder of the drive circuit 49 of FIG. 7.

Figure 8:
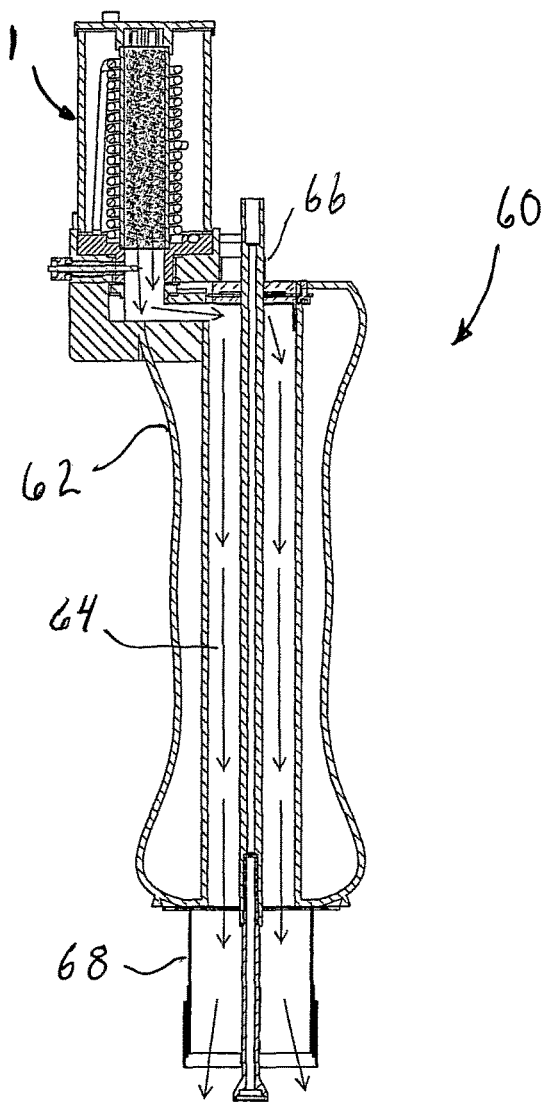
FIG. 8 shows a handheld convective soldering and rework apparatus incorporating the heater of the present invention.

FIG. 8 shows a handheld convective soldering and rework apparatus incorporating the heater of the present invention and described above. In this version, the heater 1 is incorporated into a hand grip 62 such that the discharge passage 31 is connected to an outflow passage 64, through which a vacuum pickup 66 extends in a conventional manner, to a discharge nozzle 68. Apart from the incorporation of the heater 1, the handheld convective soldering and rework apparatus can be of any known type.

Figure 9:
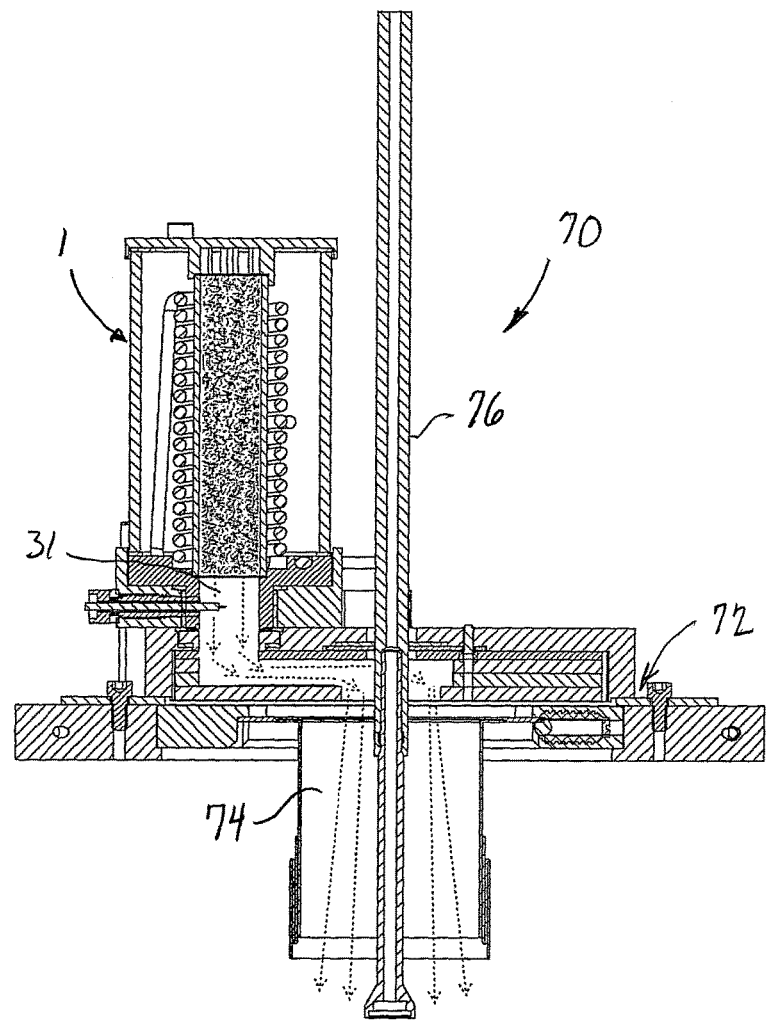
FIG. 9 shows a bench-top convective soldering and rework apparatus incorporating the heater of the present invention.

FIG. 9 shows a bench-top convective soldering and rework apparatus 70 incorporating the heater 1 of the present invention, as described above. In this case, the base of the heater 1 is mounted on the base 72 of the bench top apparatus 70. Heated air from the discharge passage 31 is directed through the base 72 of the bench top apparatus 70 to an outflow passage 74, through which a vacuum pickup 76 extends in a conventional manner. Again, apart from the incorporation of the heater 1, the bench-top convective soldering and rework apparatus can be of any known type.

As a result of the above described construction, the various advantages described in the Summary above, can be obtained, the heater of the invention being especially well suited for use in convective soldering and rework apparatus.

What is claimed is:

1. An induction heater, comprising:
   a base having a cool air inlet for connection to a supply of cool air and a heated air outlet,
   a top cover,
   inner and outer chamber cylinders connected in an air tight manner to the base and cover with an inner chamber being formed within the inner chamber cylinder and an outer chamber being formed between the inner and outer chamber cylinders,
   a heat exchange core disposed in the inner chamber, and
   an induction heater coil disposed in the outer chamber extending around an outer side of the inner chamber cylinder,
   wherein a flow path is provided from the cool air inlet, along the outer chamber outward of the induction heater coil, into the inner chamber and through the inner chamber and the heat exchange core to the heated air outlet in a counterflow direction relative to the flow along the outer chamber; and
   wherein the heat exchange core is made of a steel wool material through strands of which air flowing through the inner chamber is able to pass.

2. The inductive heater according to claim 1, further comprising a drive circuit for the induction heater mounted in proximity to the induction heater, the drive circuit being connected to the induction heater coil by conductor strips having an area sufficient to provide convection cooling for protecting the drive circuit from overheating.

3. The inductive heater according to claim 1, wherein the chamber cylinders are made of glass.

4. The inductive heater according to claim 1, wherein cool air inlet is oriented in a direction which produces to create a vortex flow pattern in the outer chamber.

5. The inductive heater according to claim 1, wherein said base comprises a metal base part which forms a bottom wall of the inner and outer chamber cylinders and a ceramic base part that contains a passage into which a terminal for connection to a thermocouple is received, wherein the metal base part has an outlet portion that forms a discharge passage connected to the heated air outlet and wherein the ceramic base part has an opening into which the outlet portion of the metal base part extends.

6. The inductive heater according to claim 1, wherein a thermocouple is located in the discharge passage to measure the temperature of exiting hot air to provide temperature feedback to a control circuit.

7. In a convective soldering and rework apparatus, having:
   a heater for heating air and
   an heated air discharge nozzle through which a vacuum pickup extends;
   the improvement comprising:
   said heater being an induction heater having an induction heating element, the heater, comprising:
   a cool air inlet for connection to a supply of cool air,
   a heated air outlet for connection to the heated air discharge nozzle,
   an outer chamber in which induction heating element is located, and
   an inner chamber containing a heat exchange core;
   wherein a flow path is provided from the cool air inlet through the outer chamber around the induction heating element and then through the inner chamber within the induction heating element to the heated air outlet; and wherein the heat exchange core is made of a steel wool material through strands of which air flowing through the inner chamber is able to pass to the heated air outlet.

8. The convective soldering and rework apparatus according to claim 7, further comprising a drive circuit for the induction heater mounted in proximity to the induction heater, the drive circuit being connected to the induction heater coil by conductor strips having an area sufficient to provide convection cooling for protecting the drive circuit from overheating.

9. The convective soldering and rework apparatus according to claim 7, further comprising inner and outer chamber cylinders connected in an air tight manner to a heater base and a top cover with an inner chamber being formed within the inner chamber cylinder and an outer chamber being formed between the inner and outer chamber cylinders,
a heat exchange core disposed in the inner chamber, and
an induction heater coil disposed in the outer chamber extending around the inner chamber cylinder,
wherein said flow path extend from said cool air inlet through said outer chamber along the induction heater coil and then through the heat exchange core disposed and inner chamber to said heated air outlet in a counterflow direction relative to flow through said outer chamber.

10. The convective soldering and rework apparatus according to claim 9, wherein the chamber cylinders are made of glass.

11. The convective soldering and rework apparatus according to claim 9, wherein cool air inlet is oriented in a direction which produces to create a vortex flow pattern in the outer chamber.

12. The convective soldering and rework apparatus according to claim 7, further comprising a bench top having a discharge nozzle through which said vacuum pickup extends, wherein said heater has a base for mounting on said bench top, wherein said cool air inlet and said heated air outlet are provided in said base, and wherein said heated air outlet is connected to said bench top in a manner enabling heated air to travel to said discharge nozzle.

13. The convective soldering and rework apparatus according to claim 12, further comprising a drive circuit for the induction heater mounted in proximity to the induction heater, the drive circuit being connected to the induction heater coil by conductor strips having an area sufficient to provide convection cooling for protecting the drive circuit from overheating.

14. The convective soldering and rework apparatus according to claim 7, further comprising a handle having a handgrip having an inner passage through which said vacuum pickup extends, the inner passage having an outlet end to which said discharge nozzle is connected, wherein said heated air outlet is connected to said handle in a manner directing heated air from said outlet to said inner passage.

15. The convective soldering and rework apparatus according to claim 14, further comprising a drive circuit for the induction heater mounted in proximity to the induction heater, the drive circuit being connected to the induction heater coil by conductor strips having an area sufficient to provide convection cooling for protecting the drive circuit from overheating.

16. The convective soldering and rework apparatus according to claim 7, wherein a thermocouple is located in the discharge passage to measure the temperature of exiting hot air to provide temperature feedback to a control circuit.

17. A handheld convective soldering and rework apparatus, comprising:
a heater for heating air,
an heated air discharge nozzle, and
a hand grip having to an outflow passage through which a vacuum pickup extends,
the improvement comprising:
said heater being an induction heater having an induction heating element, comprising:
a cool air inlet for connection to a supply of cool air,
a heated air outlet for supplying heated air to the heated air discharge nozzle,
wherein a flow path is provided from the cool air inlet along the outside of the induction heating element and through a heat exchange medium located within the induction heating element to the heated air outlet along the induction heater,
wherein the heater is incorporated into and upper end of the hand grip such that the heated air outlet is connected to an inlet end of the outflow passage, an outlet end of the out flow passage being connected to the discharge nozzle.

18. A bench-top convective soldering and rework apparatus comprising:
a heater for heating air, and
an outflow passage through which a vacuum pickup extends,
a base to an upper side of which the heater is attached and to a lower side of which the outflow passage is connected,
the improvement comprising:
said heater being an induction heater having an induction heating element, the heater comprising:
a cool air inlet for connection to a supply of cool air,
a heated air outlet for connection to a heated air passage through said base,
wherein a flow path is provided from the cool air inlet along the outside of the induction heating element, through a heat exchange medium located within the induction heating element to the heated air outlet along the induction heater, and then, via said heated air passage to an inlet end of the outflow passage, and around the vacuum pickup to an outlet end of the outflow passage.

* * * * *